(12) United States Patent
Frisch

(10) Patent No.: US 8,800,198 B2
(45) Date of Patent: Aug. 12, 2014

(54) ILLUMINATED INSECT TRAP

(76) Inventor: Jeffrey Frisch, Brooklyn, NY (US)

(*) Notice: Subject to any disclaimer, the term of this patent is extended or adjusted under 35 U.S.C. 154(b) by 134 days.

(21) Appl. No.: 13/411,237

(22) Filed: Mar. 2, 2012

(65) Prior Publication Data

US 2012/0167450 A1 Jul. 5, 2012

Related U.S. Application Data

(63) Continuation-in-part of application No. 13/268,060, filed on Oct. 7, 2011.

(60) Provisional application No. 61/417,509, filed on Nov. 29, 2010.

(51) Int. Cl.
*A01M 1/04* (2006.01)
*A01M 1/14* (2006.01)

(52) U.S. Cl.
USPC .............................................. 43/113; 43/114

(58) Field of Classification Search
USPC .................................. 43/113, 114, 107, 115
IPC ....................................... A01M 1/04,1/10, 1/14
See application file for complete search history.

(56) References Cited

U.S. PATENT DOCUMENTS

| | | | |
|---|---|---|---|
| 5,203,816 A * | 4/1993 | Townsend | 43/114 |
| 5,622,001 A * | 4/1997 | Kazmierzak | 43/121 |
| 6,108,966 A | 8/2000 | Otomo et | |
| 6,481,152 B1 | 11/2002 | Gray | |
| 6,718,687 B2 * | 4/2004 | Robison | 43/114 |
| 2005/0126069 A1* | 6/2005 | Taylor et al. | 43/113 |
| 2005/0155277 A1 | 7/2005 | Bagnall et al. | |
| 2006/0248783 A1 | 11/2006 | Lindquist et al. | |
| 2007/0044371 A1* | 3/2007 | Meier et al. | 43/107 |
| 2007/0175085 A1* | 8/2007 | Chen | 43/112 |
| 2008/0066372 A1 | 3/2008 | Fleming | |

FOREIGN PATENT DOCUMENTS

CN 2708660 7/2005

OTHER PUBLICATIONS

PCT Written Opinion, PCT/US2012/041533.

* cited by examiner

*Primary Examiner* — Darren W Ark
*Assistant Examiner* — Thien Thanh Pham
(74) *Attorney, Agent, or Firm* — Bernard Malina

(57) ABSTRACT

An insect trap includes an internal source of multi-directional illumination mounted within the housing. The outer surface of the housing has an adhesive layer. The internal source of illumination attracts insects which fly onto the adhesive layer and become ensnared on the surface of the housing.

21 Claims, 7 Drawing Sheets

US 8,800,198 B2

ILLUMINATED INSECT TRAP

CROSS REFERENCES

This application is a Continuation-in-Part and claims priority from a non-provisional patent application titled Illuminated Insect Trap having Ser. No. 13/268,060 filed on Oct. 7, 2011, which is a completion of a provisional patent application Ser. No. 61/417,509 filed on Nov. 29, 2010.

BACKGROUND OF THE INVENTION

The prior art includes various examples of adhesive insect traps. These traps function by providing an adhesive layer which ensnares an insect when the insect touches the adhesive layer. While reasonably effective these prior art insect traps do not have a means for attracting insects.

FIELD OF THE INVENTION

The present invention relates generally to the field of traps for insects and more particularly to an illuminated insect trap.

OBJECTS AND SUMMARY OF INVENTION

It is an object of the present invention to provide an insect trap which attracts insects by providing a source of illumination.

Another object of the present invention is to provide an illuminated insect trap which provides multi-directional illumination.

Another object of the present invention is to provide an illuminated insect trap which includes an adhesive layer to ensnare insects which come into contact with the insect trap.

Another object of the present invention is to provide an illuminated insect trap which is battery operated and does not require an external source of power.

Another object of the present invention is to provide an illuminated insect trap which can be conveniently suspended in outdoor locations.

Yet another object of the present invention is to provide an illuminated insect trap which incorporates a relatively small number of component parts each of which can be economically manufactured in volume resulting in a relatively low unit cost.

Still a further object of the present invention is to provide refill adhesive cylinders for an illuminated insect trap.

Additional objects and advantages of the invention will be made clear hereinafter.

In accordance with the present invention there is provided an illuminated insect trap which includes an internal source of multi-directional illumination which is located within a generally cylindrical hollow translucent or transparent housing. The outer surface of the housing is coated with a non-drying adhesive layer. The illumination serves to attract flying insects which fly onto the adhesive layer and become ensnared.

BRIEF DESCRIPTION OF THE DRAWINGS

Additional objects and advantages of the present invention may be had by referring to the following specific description taken with the following drawings in which.

DETAILED DESCRIPTION OF THE INVENTION

Figure 1:
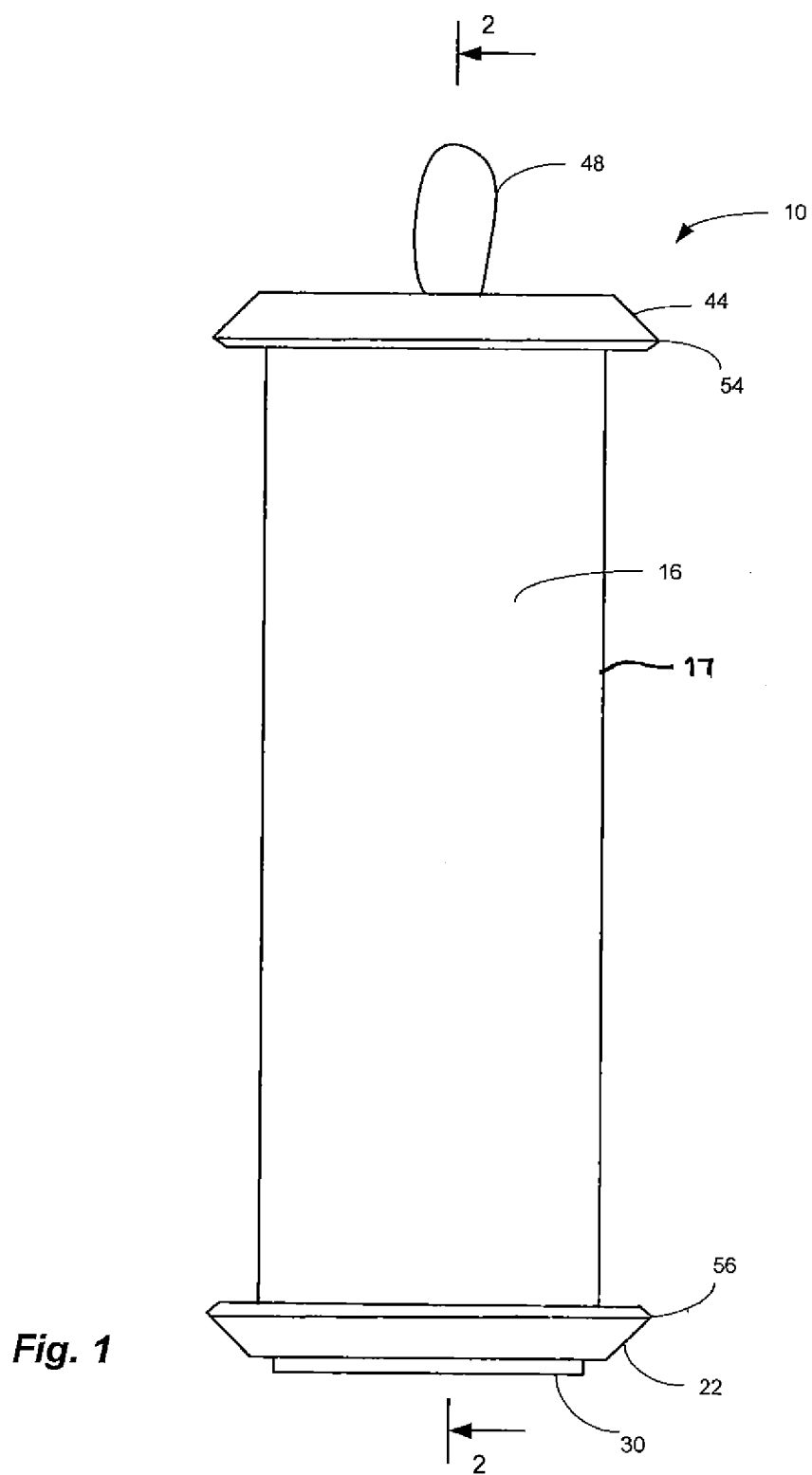
FIG. 1 is an elevation view of an illuminated insect trap made in accordance with the present invention.

FIG. 1 reveals one embodiment of the invention. The illuminated insect trap 1 features a hollow, light permeable housing 2 having a first end 4 and a second end 6, the second being remote form the first end. Each end of the housing defines an open mouth thereof. A cap 10 is deposed over the first end of the housing. A base 12 covers the second end of the housing. Within the base is an illumination source 14 for luminating an inner surface of walls forming the housing. Light emitting diodes (LED) are particularly useful as the illumination source. An adhesive layer 16 is found disposed on an outer surface of the housing. This adhesive layer coats a majority of the housing outer surface, and in most embodiments covers essentially all of the outer surface.

Both the cap 10 and the base 12 in the shown embodiment have a respective flange 18, 20. A suspension device 22 is attached to the cap of one embodiment. Suitable suspension devices may be a cord, a hook, a clip or a glue patch. By this device, the trap can be hung from a suitable support.

Ordinarily the adhesive layer 16 will be protected prior to use by a release layer 17 which may take a form of a silicone treated paper or plastic film. When ready to use the trap, the release layer is stripped away from and exposes the adhesive layer.

The housing normally will be cylindrical and formed of a flexible plastic from such material as polyethylene, polypropylene or polyvinyl acetate. In one embodiment, the housing is formed from a 2-dimensional sheet of flexible plastic which when bent into a cylinder features a seam 26 with one border of the sheet overlapping an opposite border and heat sealed or glued together thereby forming the cylindrical shape.

Arranged within the base is an electrical switch 28 for activating a battery 24 to energize the lumination source (14).

Figure 2:
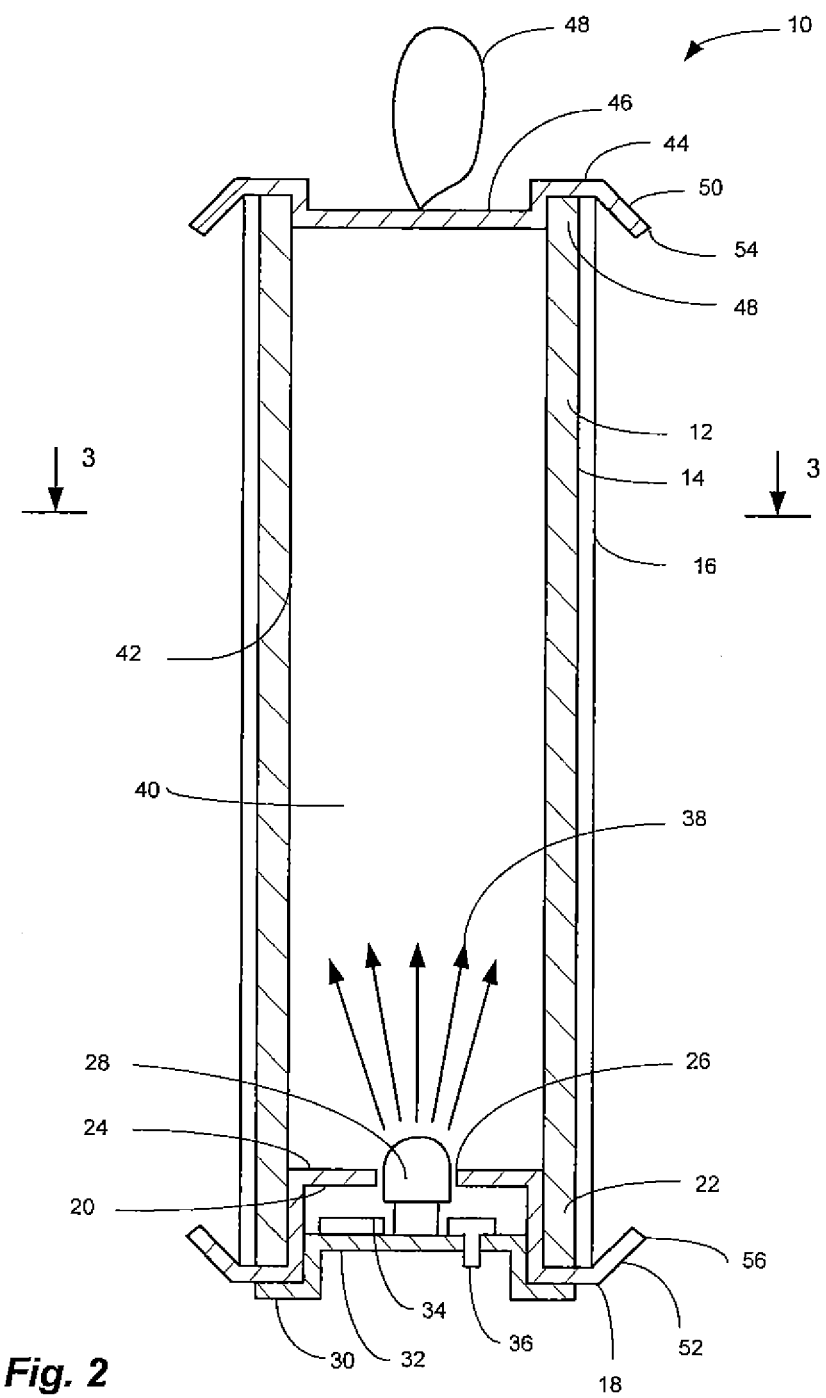
FIG. 2 is a cross-sectional view taken along the line 2-2 of FIG. 1.

FIG. 2 reveals further features of the FIG. 1 embodiment. Base 12 includes a base projecting portion 30 press fit into a hollow portion 32 formed within the base wall 34. Horizontal section 36 of the base wall 34 press fits against inner surfaces 38 of the housing. Battery 24 is arranged within the hollow portion 32. Activation of the battery causes the LED to emit light 40 which illuminates the inner surfaces 38 of the housing.

Cap 10 features a cap projecting portion 42 which securely closes off the first end by forming a forced fit with inner surfaces 38 of the housing. Although snap or force fit has been described as a preferred attachment mechanism for the cap and base, alternative methods may be employed such as screws, clamps or adhesives.

Figure 3:
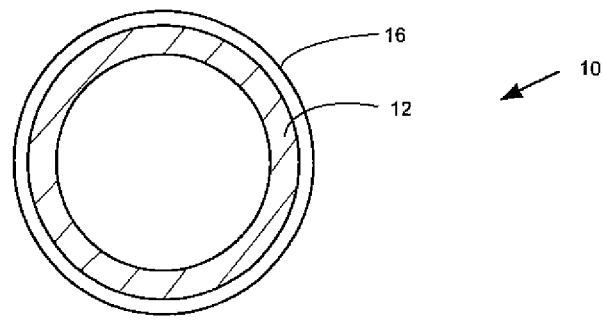
FIG. 3 is a cross-sectional view taken along the line 3-3 of FIG. 2.

FIG. 3 illustrates the housing in cross-section being of generally circular shape.

Figure 4:
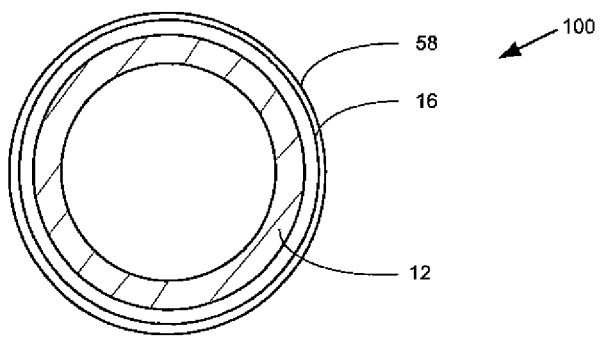
FIG. 4 is a cross-sectional view similar to FIG. 3 showing an additional element which is a release layer.
Figure 5:
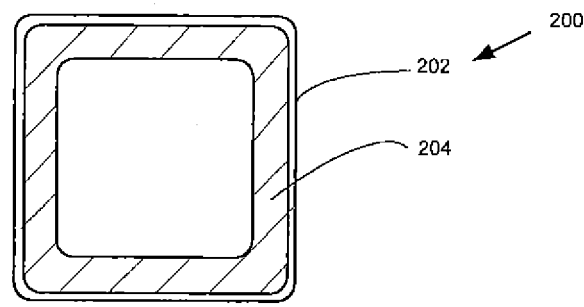
FIG. 5 is a cross-sectional view similar to FIG. 3 showing a first alternative embodiment of the invention in which the housing has a non-circular cross-section.

FIG. 4 adds the further aspect of release layer 17. A first alternative embodiment is seen in FIG. 5 wherein the cross-sectional shape is generally square or rectangular. Other polygonal cross-sectional shapes may also be useful as well as oval shape.

The non-circular shapes have the advantage of providing additional illuminated surface area and additional area for the adhesive layer and as a result additional area for entrapment of insects. On the other hand, a circular shape has manufacturing advantage. A two-dimensional flat plastic sheet is easily rolled into a cylindrical shape with an overlap section forming a seam. The seam can be secured either by addition of glue or simply a heat seal of the plastic itself.

The illuminated insect trap according to the present invention may be used in both indoor and outdoor locations. The continuous surface of the housing and the construction of the cap and base prevent damage due to rain. The battery operated LED lamp enables the trap to be used safely outdoors in wet conditions.

Figure 6:
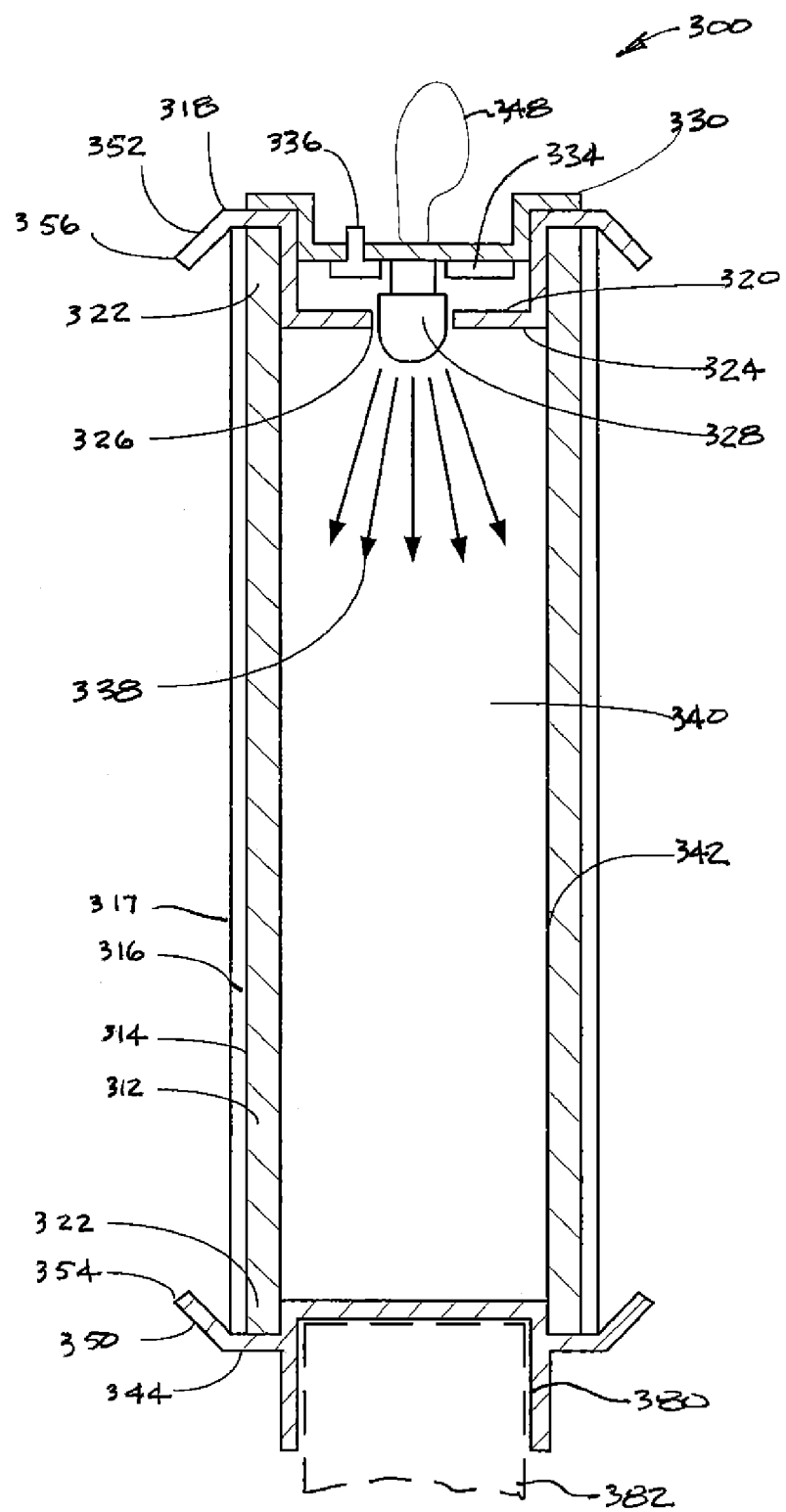
FIG. 6 is a cross-sectional view similar to FIG. 2 showing a second alternative embodiment of the invention.

FIG. 6 shows a second alternative embodiment of the trap 300 in which the illumination source 328 is mounted in the cap 318.

The illuminated insect trap 300 includes a generally cylindrical hollow housing or body 312 the outer surface 314 of which is coated with a non-drying adhesive layer 316. The housing 312 is preferably made of plastic and may be either translucent or transparent. The adhesive layer 316 is translucent or transparent. The housing 312 has the general configuration of a hollow cylinder having a continuous non-perforated surface.

Cap 318 includes a central portion 320 which is force fit or snap fit into the bottom end 322 of the housing 312. The surface 324 of the central portion 320 has an aperture 326 which accepts a light emitting-diode, LED, lamp 328. The LED lamp 328 is mounted on a cover 330. The cover 330 may be force fit or snap fit into the top cap 318. A battery 334, a switch 336 and electrical connections forming a conventional electrical circuit connecting the LED 328, are mounted on a cap projecting portion 334. The electrical connections are conventional and well known in the art and therefore have not been illustrated or described in detail.

The illumination provided by the LED 328 has been indicated symbolically by the arrows 338 in FIG. 6. The illumination is multi-directional with the entire internal cavity 340 and the inner surface 342 of the housing 312 being illuminated. Internal reflection within the internal cavity enables the entire housing 312 to present a relatively uniform illuminated surface 317 of the adhesive layer 316 which is attractive to insects.

A cap projecting portion 344 includes a loop of cord 348 enabling a user to suspend the illuminated insect trap 300 in a convenient manner in any desired location. When suspended, the illuminated insect trap 300 is able to attract flying insects from any direction. The insects fly onto the adhesive layer 316 and become adhered to the adhesive layer 316 and the trap 300 provides an effective means of insect control.

The base 347 and the cap 318 each have projecting flanges 350, 352 that enable the apparatus 300 to be packaged and shipped with the edges 354, 356 of the flanges 350, 352 in contact with conventional boxes or packaging materials and prevent contact between these packaging materials and the adhesive layer 316.

The base 347 includes a cavity portion 380 which allows the insect trap 300 to be mounted on a post 382.

Figure 7:
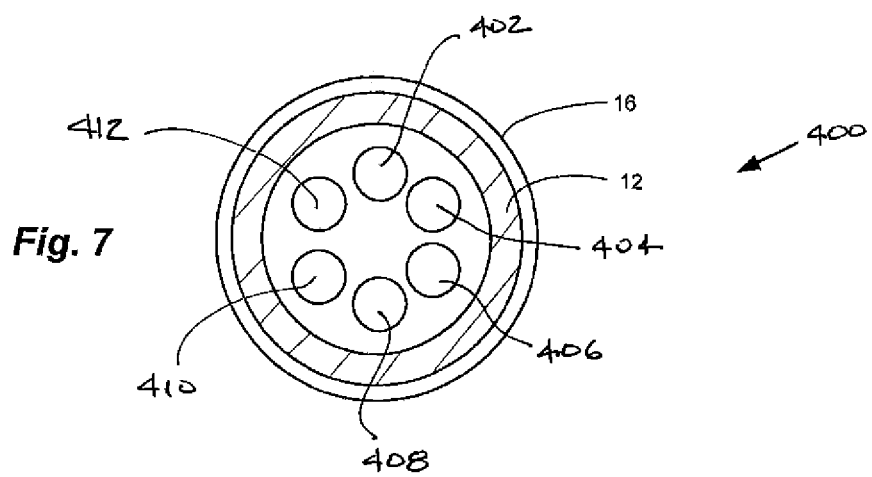
FIG. 7 is a cross-sectional view similar to FIG. 6 showing a third alternative embodiment of the invention.

FIG. 7 shows a third alternative embodiment of the trap 400 in which a plurality of LEDs 402, 404, 406, 408, 410 and 412 are employed in constructions detailed for FIGS. 1, 2 and 6 previously described.

The illuminated insect trap, according to the present invention, may be mounted vertically, horizontally or at any desired angle.

Figure 8:
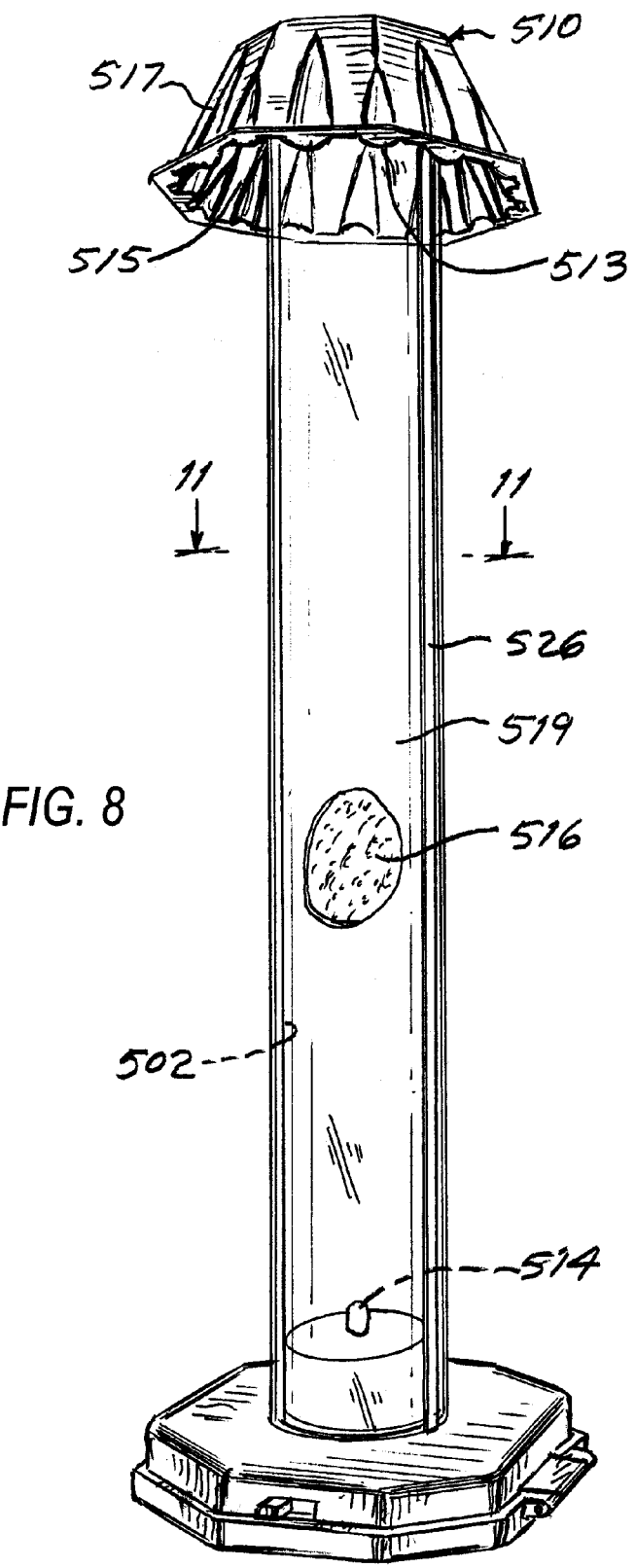
FIG. 8 is a perspective view of a fourth alternative embodiment of the invention.

FIG. 8 reveals a fourth alternative embodiment of the illuminated insect trap 500. With certain exception, construction details are similar to that described for the embodiments shown in FIGS. 1 and 2. The embodiment reveals a cylindrical housing 502 having an adhesive layer 516 deposited thereupon. The cylindrical housing has been formed from a flat sheet bent around with one elongate edge covering an opposite elongate edge to form a seam 526. A LED lamp 514 provides illumination within the cylindrical housing and exits through transparent walls of the housing and through a transparent adhesive layer 516. Cap 510 is of a crenulated construction with a plurality of pleats 513 both on an inner and outer surface of the cap. The pleats form a series of grooves. These grooves range in number from 6 to 50, preferably from 10 to 30. The pleats on the inner surface help to diffuse light from the LED lamp thereby increasing the insect attracting power of the trap. Of particular note, is that the interior surface 515 of the cap has a white color. Light which traverses the cylindrical housing upon hitting the interior surface 515 reflects backward creating the appearance of an additional light source. The exterior surface 517 of cap 510 can be of a different color than the white of the interior surface. For instance, exterior surface 517 may be black.

Figure 9:
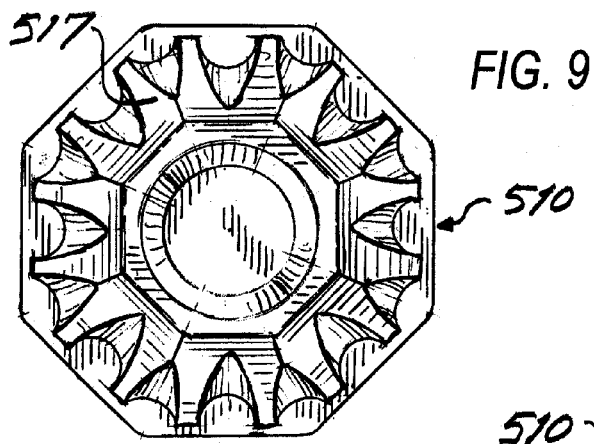
FIG. 9 is a top plan view of the cap element of the fourth alternative embodiment shown in FIG. 8.
Figure 10:
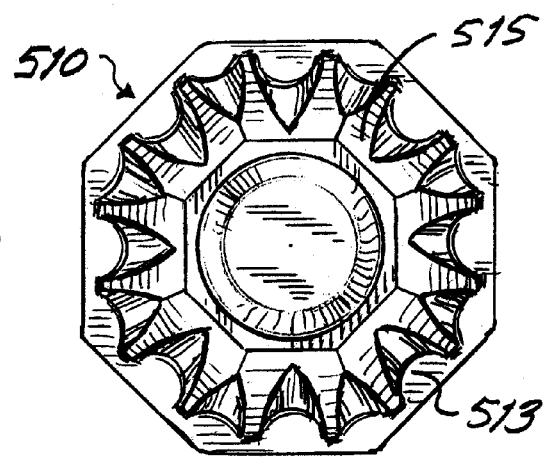
FIG. 10 is a bottom plan view of the cap shown in FIG. 9.

FIGS. 9 and 10 illustrate the respective top and bottom views of cap 510. These best illustrate the pleats 513.

Figure 11:
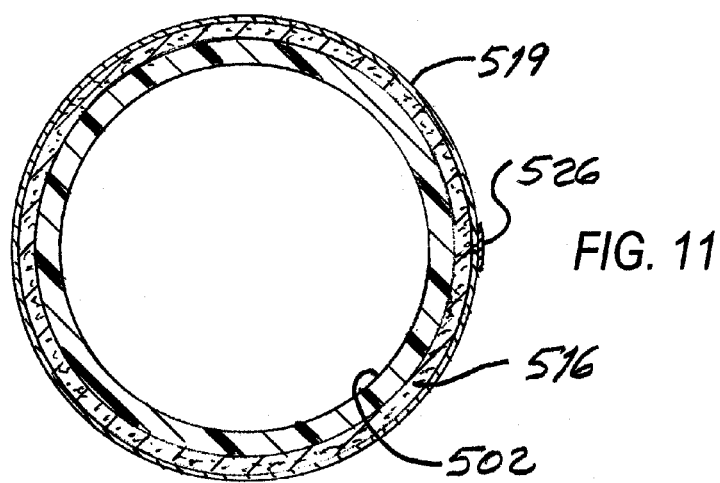
FIG. 11 is a cross-sectional view taken along the line 11-11 of FIG. 8.

FIG. 11 is a cross-sectional view of the cylindrical housing 502 showing the adhesive layer 516 and a release layer 519 requiring removal prior to operation of the illuminating insect trap.

Periodically the housing may need replacement because the adhesive layer may have dried or trapping surfaces may have become clogged with trapped insects. A refill without the costly base, LED and electrical connections can serve as a replacement. The refill will include the housing along with a deposited adhesive layer on the outer surface. A cap 10 is ordinarily included as a gripping area to avoid finger contact with the sticky adhesive layer. A cover may be force fit inserted to close-off the second end of the housing.

The foregoing specific embodiments of the present invention as set forth in the specification herein are for illustrative purposes only. Various deviations and modifications may be made within the spirit and scope of this invention, without departing from a main theme thereof.

What is claimed is:
1. An illuminated insect trap comprising:
a hollow, light permeable housing with the housing having an outer surface, a first end, a second end remote from the first end and an inner surface;
an adhesive layer disposed on the outer surface of the housing;
a cap disposed on the first end of the housing, the cap being of a crenulated construction with a plurality of pleats both on an inner and an outer surface of the cap, the plurality of pleats defined by a series of grooves ranging in number front 6 to 50;
a base disposed on the second end of the housing; and an illumination source disposed in the base and with the illumination source illuminating the inner surface of the housing.

2. The illuminated insect trap of claim 1, wherein the illumination source comprises a battery operated emitting diode.

3. The illuminated insect trap of claim 1, wherein the cap comprises a flange.

4. The illuminated insect trap of claim 1, wherein the base comprises a flange.

5. The illuminated insect trap of claim 1, wherein the housing is transparent or translucent.

6. The illuminated insect trap of claim 1, wherein the housing has a circular cross-section.

7. The illuminated insect trap of claim 1, wherein the cap comprises a cap projecting portion projecting into the housing.

8. The illuminated insect trap of claim 7, wherein the cap projecting portion and the housing form a force fit.

9. The illuminated insect trap of claim 1, wherein the base comprises a base projecting portion projecting into the housing.

10. The illuminated insect trap of claim 9, wherein the base projecting portion and the housing form a force fit.

11. The illuminated insect trap of claim 1 further comprising a release layer disposed on the adhesive layer.

12. The illuminated insect trap of claim 1, wherein the cap comprises a suspension device.

13. The illuminated insect trap of claim 12, wherein the suspension device is a suspension cord.

14. The illuminated insect trap of claim 1, wherein the base has a hollow portion and further comprises one or more batteries in the hollow portion.

15. The illuminated insect trap of claim 1 wherein the interior of the cap is white in color.

16. The illuminated insect trap of claim 1, wherein the housing comprises a flexible plastic.

17. The illuminated insect trap of claim 16, wherein the housing along a length thereof has a seam formed by overlapping sections of the housing.

18. A refill for an illuminated insect trap comprising:
a cylindrical hollow light permeable housing with the housing having an outer surface, a first end and a second end remote from the first end and an inner surface;
an adhesive layer disposed on the outer surface of the housing; and
a cap disposed on the first end of the housing, the cap being of a crenulated construction with a plurality of pleats both on an inner and an outer surface of the cap, the plurality of pleats defined by a series of grooves ranging in number from 6 to 50.

19. The refill for an illuminated insect trap as claimed in claim 18 wherein the cap is force fittingly disposed on the first end of the housing.

20. The refill for an illuminated insect trap as claimed in claim 19 wherein the second end of the housing is open.

21. The refill for an illuminated insect trap as claimed in claim 19 wherein an interior surface of the cap is white in color.

* * * * *